No. 623,113. Patented Apr. 11, 1899.
J. WATERBURY.
ANTIFRICTION BEARING.
(Application filed Oct. 17, 1898.)
(No Model.)
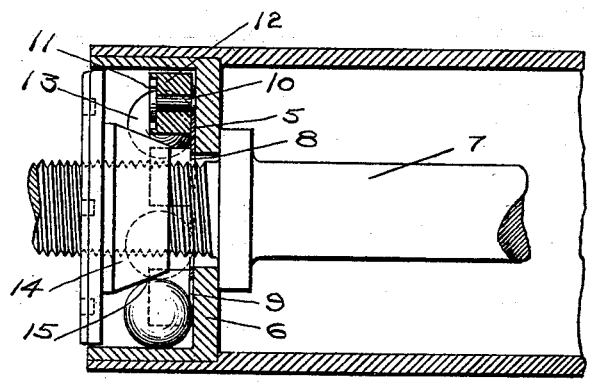
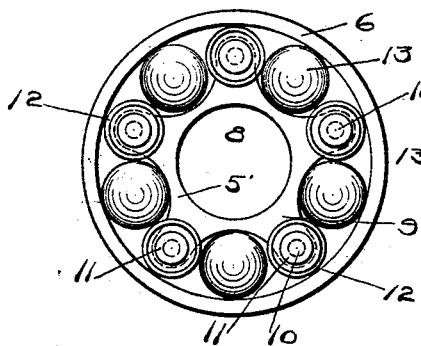 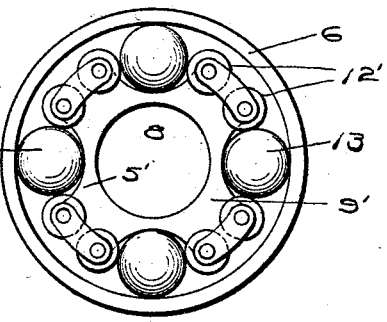
WITNESSES:
Frank W. Beberdick
M. L. Nichols
INVENTOR
Jonathan Waterbury.
BY
Garry P. Van Wye.
ATTORNEY

UNITED STATES PATENT OFFICE.

JONATHAN WATERBURY, OF NEW YORK, N. Y., ASSIGNOR OF ONE-HALF TO HERMAN GEIGER, OF SAME PLACE.

ANTIFRICTION-BEARING.

SPECIFICATION forming part of Letters Patent No. 623,113, dated April 11, 1899.

Application filed October 17, 1898. Serial No. 693,795. (No model.)

*To all whom it may concern:*

Be it known that I, JONATHAN WATERBURY, a citizen of the United States, residing at Brooklyn, in the city of New York, county of Kings, and State of New York, have invented a new and useful Antifriction-Bearing, of which the following is a specification.

This invention relates to bearings for shafts, &c., and has for its object to reduce the friction in the journals. I attain this object by the mechanism illustrated in the accompanying drawings, in which—

Figure 1 is a view of a shaft with a sectional view of my invention applied thereto.
Fig. 2 is a plan view of my improved antifriction-bearing with the cone removed, and Fig. 3 is a modification thereof.

In the drawings the separate parts are indicated by numerals of reference, and in the practice of my invention I provide a plate 5, which I mount loosely in the cup 6, which is mounted in the hub or bracket of a bicycle in a manner well known and therefore not described in this connection. 7 represents the shaft, and the plate 5 is provided with a central opening 8, which is greater in diameter than that of the shaft 7, and with radial arms 9, to each of which is secured a short shaft 10, having a head 11, and on the shaft 10 I mount a small roller 12. The plate 5 is made of such a size that when placed in the cup 6 the peripheries of the rollers 12 will not come in contact with the inner wall of the cup; but this feature is not essential.
Between each of the radial arms 9 I mount a bearing-ball 13, which balls are so proportioned in size that they will fit loosely between the rollers 12, and the diameter of the balls is greater than the diameter of the rollers.
On the shaft 7 I mount a cone 14, which bears against the balls, as shown at 15, whereby the shaft 7 is supported by the balls 13 and no part of it comes in contact with any part of the cup 6. The cup 6 is the ordinary cup used in bicycle construction, and consists of an annular band and an inwardly-directed flange, and the cone 14 fits in the open end of said cup, so that the bearing-balls have but three points of contact in the raceway—viz., against the inner wall of the annular band of the cup, against the inwardly-directed flange, and against the cone. It will thus be seen that I have adapted my device to the most improved method of forming a raceway without sacrificing any of the essential features thereof.

The plain side of the plate 5 rotates in contact with the inwardly-directed flange of the cup; but as the rollers 12, which are mounted on stub-shafts on the opposite side of said plate, are less in diameter than the bearing-balls the plate is practically carried by the bearing-balls and the friction between the plate 5 and flange of the cup will be inappreciable.

In antifriction-bearings where balls are used exclusively the balls all rotate in one direction, so that the sides adjacent to each other rotate in opposite directions, thereby causing friction. As the rollers 12 in this construction do not come in contact with the cone 14 nor with the cup 6, they are rotated by the balls alone, and therefore always with the balls, so that there is no friction between the balls and rollers which would be in any wise appreciable. Another advantage is that the balls are always kept at equidistant points, so the cone is supported and held at every point, while with balls alone it is impossible to place them so close together in the cup but what there will be a slight space left between them at the upper side of the cup when in use, thereby causing a slight play of the axle.

In Fig. 3 I have shown a slight modification in which the radial arms 9' are reduced in number and made larger, and two rollers 12' are mounted upon each arm. A possible advantage of this construction lies in the fact that fewer bearing-balls 13 are required and the adjacent balls do not come in contact with the same roller, so that if for any reason the balls did not rotate in unison there would be no friction between the balls and rollers.

While I have described my invention as being applicable to antifriction-bearings in connection with shafts, I do not wish to confine myself to that use, as the bearing is applicable to other uses, and I claim the right to make any changes or alterations that fairly come within the scope of my invention.

Having described my invention, what I claim as new, and desire to secure by Letters Patent, is—

1. In an antifriction-bearing, a cup consisting of an annular band and an inwardly-directed flange, a cone mounted on the axle in the open end of said cup, bearing-balls mounted between said cup and said cone, a plate mounted in said cup and bearing with its plain side against the flange thereof, and rollers mounted on the opposite side of said plate and separating said balls, substantially as described.

2. In an antifriction-bearing, a cup consisting of an annular band and an inwardly-directed flange, a cone mounted on the axle in the open end of said cup, bearing-balls mounted between said cup and said cone, a plate mounted in said cup and bearing with its plain side against the flange thereof, said plate being provided with radial arms, stub-shafts on said radial arms on the side opposite to said flange, and rollers mounted on said stub-shafts, said bearing-balls being separated by said rollers, and being greater in diameter than said rollers, substantially as and for the purpose described.

In testimony that I claim the above I have hereunto affixed my signature in the presence of two subscribing witnesses.

JONATHAN WATERBURY.

Witnesses:
 F. VAN GERPEN,
 HERMAN GEIGER.